United States Patent
Murphy et al.

(10) Patent No.: US 9,814,214 B1
(45) Date of Patent: *Nov. 14, 2017

(54) GROOMING TOOL AND METHOD OF REMOVING HAIR FROM A PET ASSOCIATED THEREWITH

(71) Applicants: Jodi Murphy, Stanhope, NJ (US); David Kastner, Stanhope, NJ (US)

(72) Inventors: Jodi Murphy, Stanhope, NJ (US); David Kastner, Stanhope, NJ (US)

( * ) Notice: Subject to any disclaimer, the term of this patent is extended or adjusted under 35 U.S.C. 154(b) by 48 days.

This patent is subject to a terminal disclaimer.

(21) Appl. No.: 15/089,499

(22) Filed: Apr. 2, 2016

Related U.S. Application Data

(63) Continuation-in-part of application No. 13/962,929, filed on Aug. 8, 2013, now Pat. No. 9,301,500.

(60) Provisional application No. 61/680,907, filed on Aug. 8, 2012.

(51) Int. Cl.
*A01K 13/00* (2006.01)

(52) U.S. Cl.
CPC .................................. *A01K 13/002* (2013.01)

(58) Field of Classification Search
CPC .... A01K 13/00; A01K 13/002; A01K 13/004; A45D 24/10; A45D 24/02; A45D 24/04; A45D 24/36
USPC ....... 119/601, 611, 613, 614, 617, 620, 625, 119/627, 631, 633; 132/129, 145, 148, 132/150, 151
See application file for complete search history.

(56) References Cited

U.S. PATENT DOCUMENTS

| | | | |
|---|---|---|---|
| 152,542 A * | 6/1874 | Wright | A01K 13/002 |
| | | | 119/625 |
| 1,432,251 A | 10/1922 | Lee | |
| 1,695,765 A | 12/1928 | Howes | |
| 1,718,008 A | 6/1929 | Segal | |
| 2,034,340 A | 3/1936 | Gaisman | |
| 2,162,581 A | 6/1939 | Kapelman | |
| 3,308,500 A | 3/1967 | Woodruff | |
| 3,928,886 A | 12/1975 | Marino et al. | |
| 4,574,416 A | 3/1986 | Stewart et al. | |
| 4,617,875 A | 10/1986 | Holland | |
| 4,860,692 A | 8/1989 | Beard | |
| 5,022,350 A | 6/1991 | Sequist | |
| 5,339,840 A | 8/1994 | Koppel | |
| 5,862,780 A | 1/1999 | Landreneau | |
| 6,055,938 A | 5/2000 | Klein | |

(Continued)

OTHER PUBLICATIONS

US 5,782,846, 08/2004, Porter et al. (withdrawn)

*Primary Examiner* — Peter M Poon
*Assistant Examiner* — Danielle Clerkley
(74) *Attorney, Agent, or Firm* — Lawrence G. Fridman, Esq.; Feigin & Fridman, LLC

(57) ABSTRACT

A pet grooming tool formed with an elongated handle extending generally along a longitudinal axis thereof. A blade assembly pivotably connected to the guiding portions and formed with a blade and connecting arms extending outwardly on both sides of the blade. A pivotal arrangement provides pivotal motion of the blade assembly relative the handle. Upon pivotal motion of the connecting arms within the pivotal arrangement, while the connecting arms movably engage the guiding portions, the generated forces acting against ends of the arms act to return the connecting arms and the blade to their initial position along a longitudinal axis of the device.

19 Claims, 14 Drawing Sheets

(56) References Cited

U.S. PATENT DOCUMENTS

| | | |
|---|---|---|
| 6,955,137 B2 | 10/2005 | Dunn et al. |
| 7,077,076 B2 | 7/2006 | Porter et al. |
| 7,222,588 B2 | 5/2007 | Porter et al. |
| 7,334,540 B2 | 2/2008 | Porter et al. |
| D565,258 S | 3/2008 | Porter et al. |
| 7,509,926 B2 | 3/2009 | Porter et al. |
| 7,650,857 B2 | 1/2010 | Porter et al. |
| 7,717,067 B2 | 5/2010 | Porter et al. |
| 2005/0134064 A1 | 6/2005 | Nies |
| 2007/0084416 A1 | 4/2007 | Liao |
| 2008/0066690 A1 | 3/2008 | Rosen |
| 2009/0126648 A1 | 5/2009 | Porter et al. |
| 2012/0304938 A1* | 12/2012 | Wang .................. A01K 13/002 119/618 |
| 2014/0026821 A1 | 1/2014 | Tu |
| 2014/0026822 A1 | 1/2014 | Harris, II |
| 2014/0041597 A1 | 2/2014 | Van Der Poel |

* cited by examiner

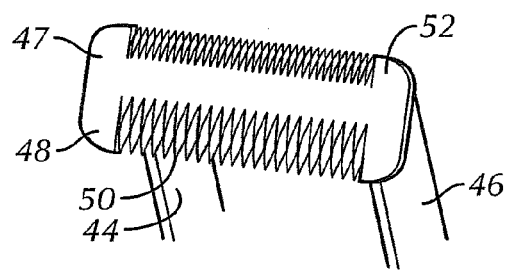
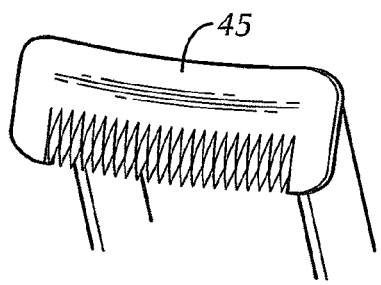
*FIG. 2A*  *FIG. 2B*
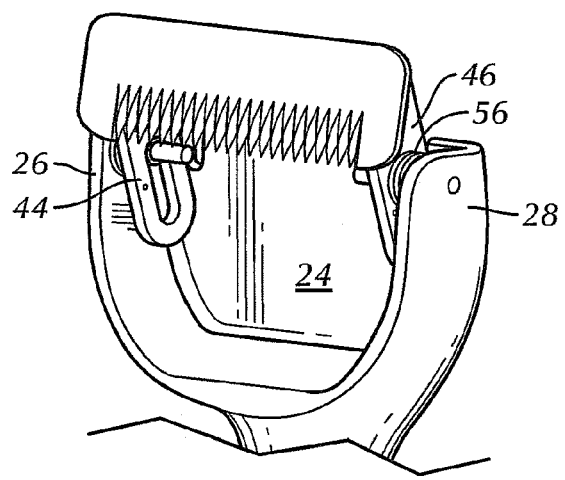
*FIG. 4*

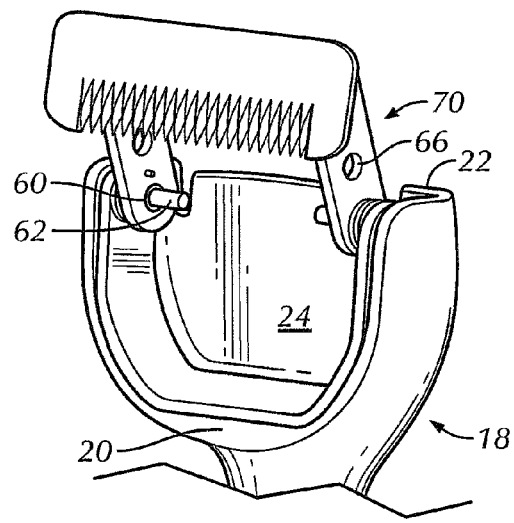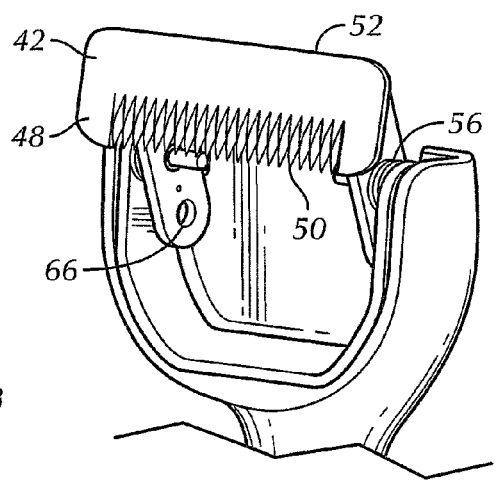
FIG. 3A  FIG. 3B
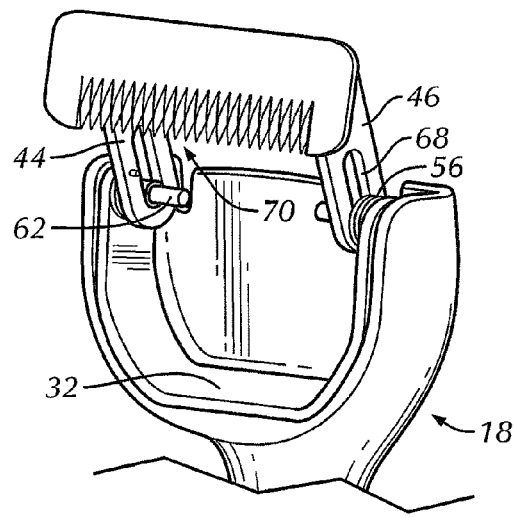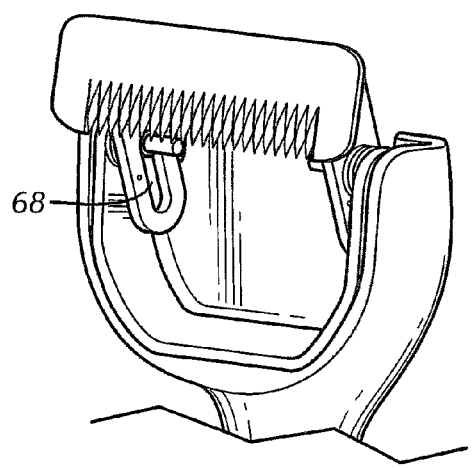
FIG. 3C  FIG. 3D

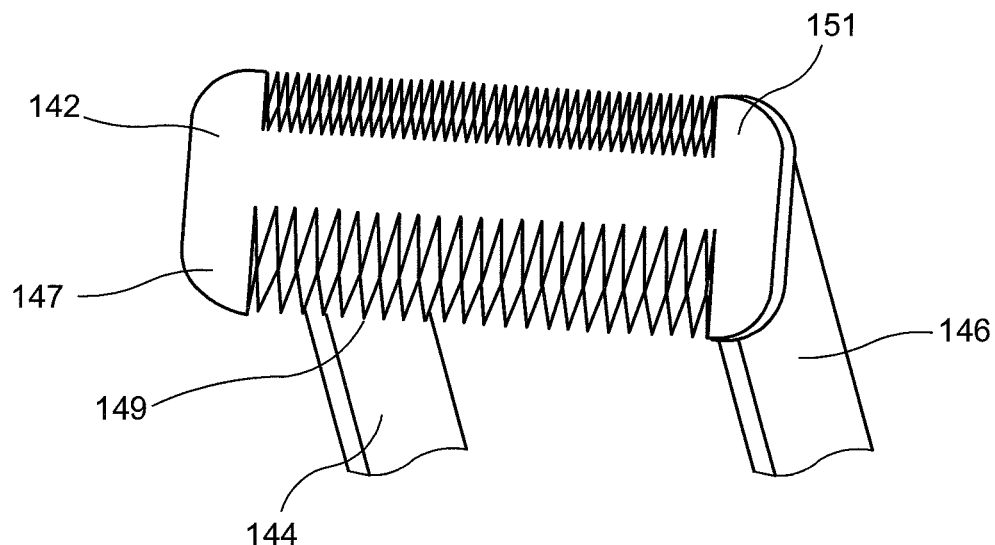
F I G. 12
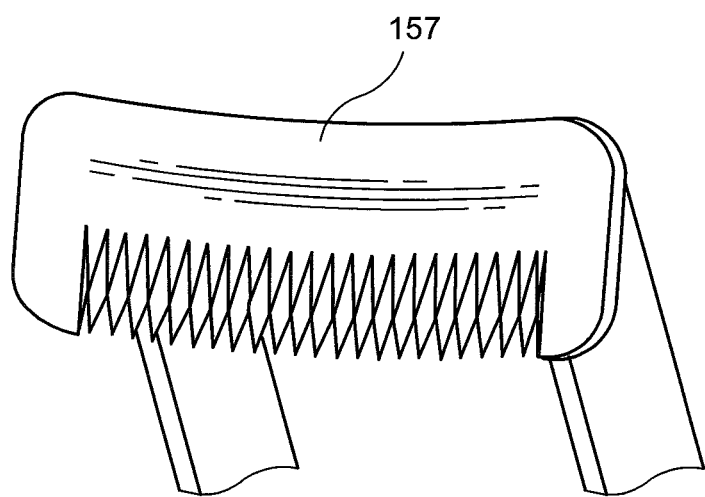
F I G. 13

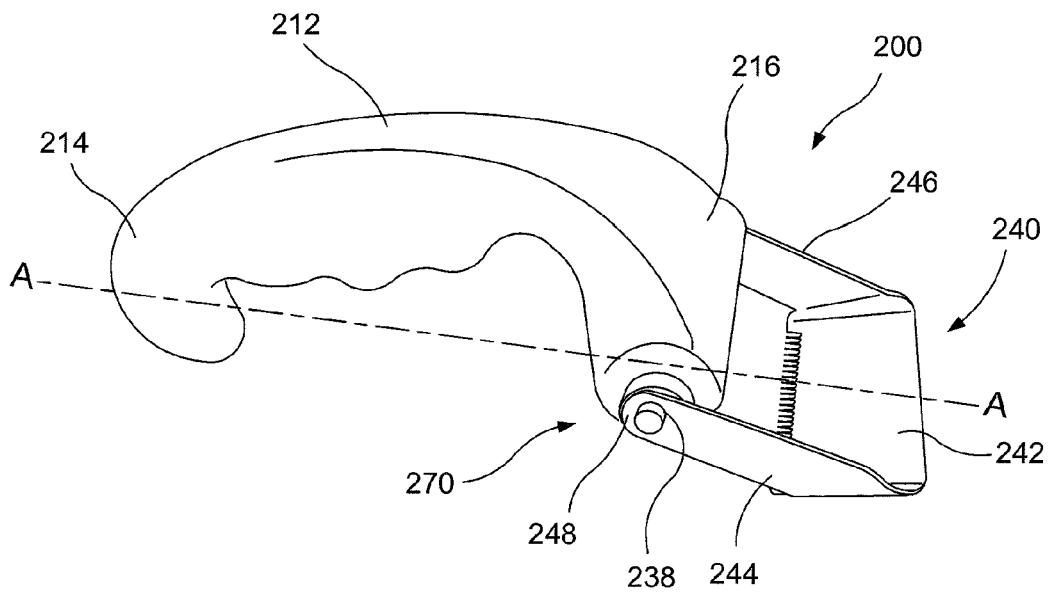
F I G. 14
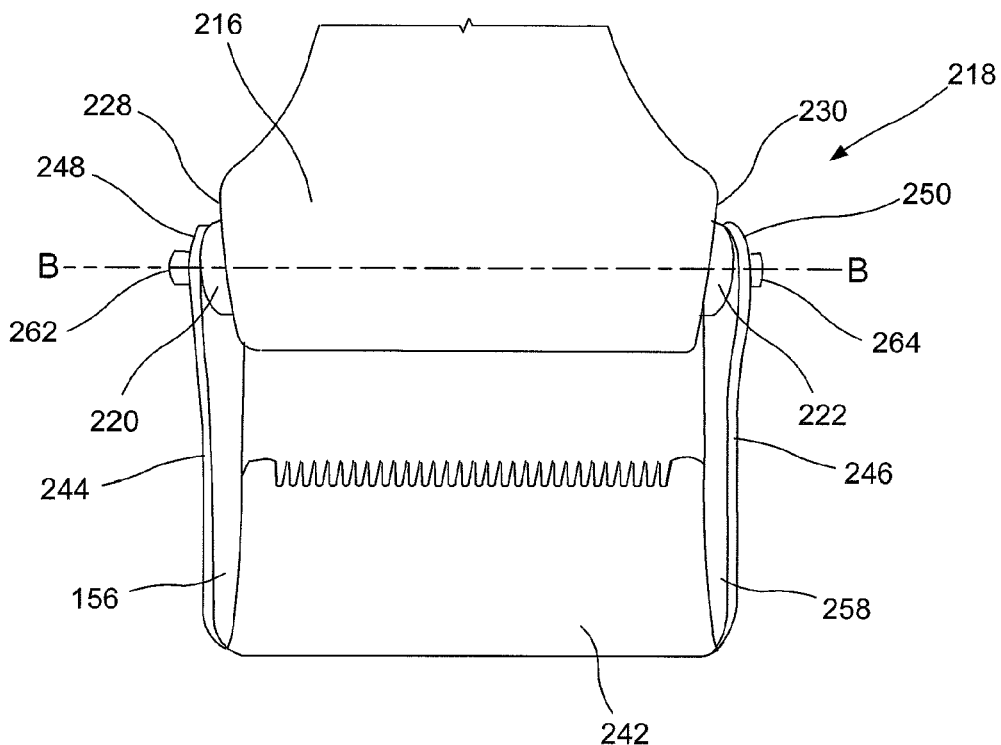
F I G. 15

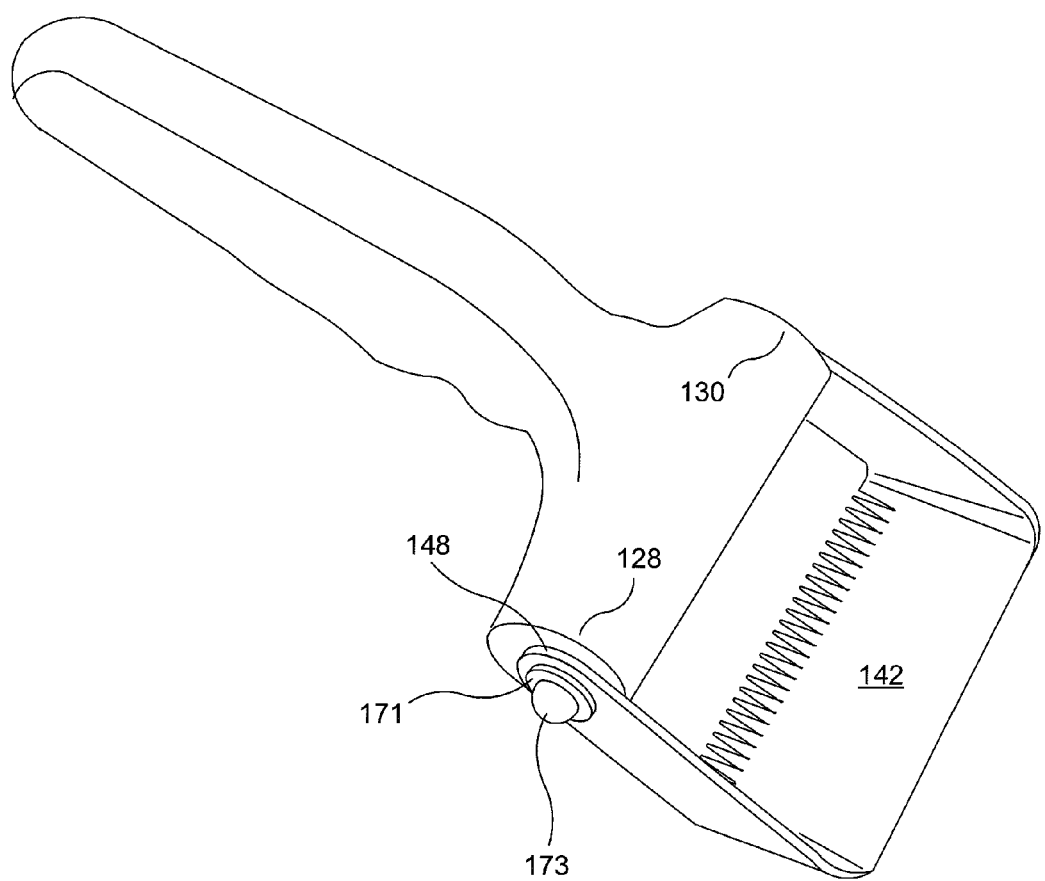
F I G. 19

GROOMING TOOL AND METHOD OF REMOVING HAIR FROM A PET ASSOCIATED THEREWITH

REFERENCE TO RELATED APPLICATION

This Application is continuation-in-part application of U.S. patent application Ser. No. 13/962,929 filed Aug. 8, 2013, which claims priority of U.S. Provisional Application Ser. No. 61/680,907 filed by the inventors on Aug. 8, 2012, the entire disclosure of which are hereby incorporated by reference.

FIELD OF THE INVENTION

The present invention relates to the field of grooming domestic animals, in general, and more particularly it relates to a grooming tool and a method of removing hair from a pet associated therewith.

BACKGROUND OF THE INVENTION

Certain breeds of dogs and cats have the tendency of shedding their undercoat or coat, especially during the spring and summer months. Dogs and cats, whether kept indoors or outdoors, will go thru this natural process of hair regeneration, and will drop a great deal of loose hair within the house of the pet owner. This not only causes a mess, but can contribute to the pet becoming overheated due to the accumulation of expelled hair trapped within their coat. This is why coat maintenance and grooming is essential to keep a pet happy and healthy.

It is known that hair growth begins inside the hair follicle. The hair that is visible is the hair shaft. The base of the root is called the bulb, which contains the cells that produce the hair shaft. Other structures of the hair follicle include the oil producing sebaceous gland which lubricates the hair and the erector pili muscles. The hair growth cycle is divided into three phases: an anagen phase, in which the hair is growing actively with a very substantial level of cell proliferation occurring in the hair follicle; a catagen phase, when the follicle slows down its proliferative activity temporarily, detached from the bulb to permit hair development; and a telogen phase, in which the follicle simply stops growing, regresses and sheds out of the follicle, and a new anagen phase begins.

Domestic animals such as dogs, have primary hair and secondary hair. The secondary hair is the undercoat that sheds. The undercoat or loose hair is hair that has already been released from the follicles and accumulated within the coat. In actuality the undercoat is loose hair which already came out of follicle or will be released, but is sitting in the coat. According to the prior art, shed/loose hair can be brushed out relatively easily by utilizing conventional tools adapted to pull the loose coat which has already been out of the follicle and accumulated within the coat. Due to its association with the follicle, the primary hair can be pulled out of the follicle when it is ready to be released.

There are known in the prior art grooming tools having a blade positioned at 90° angle to handle and to the outer surface of the coat. For proper operation of such devices a pressure has to be exerted on the blade to reach the undercoat hair. Many users, especially those with the limited grooming training, can be aggressive by applying a substantial pressure on the tool. In the prior art devices, not only the hair is being removed, but the skin of a pet is being scraped, damaged and irritated. The hair that remains on the pet is being scraped and damaged, when using a 90 degree angle oriented blade.

A carding technique is well known in the pet grooming field and is based on use of a carding/stripping knife. This technique requires knowledge and a degree of skill in order to use the knife properly. This prior art tool, if used incorrectly, is uncomfortable for a pet. Further more, it is known that this tool often causes stress and fatigue on the joints and tendons of a user, whereas repetitive wrist motions might be resulted in carpel tunnel syndrome. The tool and method of the invention represent substantial improvement over the carding technique. The design of the tool of the invention is ergonomically correct, therefore, it is quite comfortable for the user. The design of the inline handle make the tool ambidextrous.

SUMMARY OF THE INVENTION

The tool and method of the invention are especially applicable for grooming specific breeds of dogs, cats, rabbits and horses having their hair follicle positioned at an oblique angle to the skin and allowing the coat to lie flat against the skin and to grow in the direction in which it lays. In the tool of the invention, the blade is adapted to be oriented to follow the natural orientation of the pet's hair and natural contour of the pet's body.

The unique feature of the tool allows the blade to float at the proper angle to be used by anyone regardless of skill level and can be used by left or right handed people, as long as the tool is used with the lay of the coat The tool and method of the invention are especially applicable for grooming specific breeds of dogs, cats, rabbits and horses having their hair follicle positioned at an oblique angle to the skin and allowing the coat to lie flat against the skin and to grow in the direction in which it lays. Among dogs which belong to this category are many sporting dogs, terriers, double coated breeds as well as others. It is also known that such oblique angle is about 45° or smaller. In the tool of the invention, the blade is adapted to be oriented following the natural orientation of the pet's hair, the above-discussed oblique angle and natural contour of the pet's body.

An essential aspect of the grooming method apparatus of the invention is an oblique angle at which the blade is positioned with respect to the surface of the coat. This angle corresponds to the oblique angle at which the hair follicles are positioned within the skin of certain breeds of dogs, cats and other animals as mentioned above. Since the blade follows the flow of the coat, and the way the coat lays, it will remove the coat naturally without irritation. The tool of the invention should not be used in the direction opposite to the direction at which hair of a pet is oriented.

The prior art grooming tools are often formed with the blade oriented at a 90° angle to the handle. A substantial pressure has to be applied by an operator enabling the teeth of such blades to penetrate through the primary coat to the undercoat. Such pressure often causes a substantial damage to the skin of the pet as well as a scraping effect on the hair itself. In the tool of the invention, the blade and the teeth are positioned at an acute oblique angle or less to the coat of a pet. In this manner, the tool combs at an oblique angle in which corresponds to the angle of the follicles at the skin of the specific breeds of cats and dogs discussed above. The specially designed grooves which are associated with the teeth of the blade feed the coat into the teeth, further facilitating a gentle pull of the coat in a safe and mild manner.

The tool and the method of the invention enable a user to remove hair which is still within the follicle and the hair that has been released from the follicle and is trapped within the coat. In the invention hair is channeled into teeth of the blade. When hair fills the channels between the teeth a pressure will be applied on the coat which will remove hair that is alive and at the end of the life-cycle, as well as hair that has already been released from the follicle, dead hair, undercoat. One of the main objectives of the invention is to address the hair which has been detached from the bulb but still within the follicle. The tool of the invention enables the operator to remove the hair gently, stimulating release of oil from the follicle, so as to encourage a new hair growth and to promote healthy skin.

BRIEF DESCRIPTION OF THE DRAWINGS

Exemplary embodiments of the invention will be now described in greater detail below with reference to the accompanying drawings, in which:

FIG. 2A is a semi-perspective view of another embodiment of the blade;

FIG. 2B is a semi-perspective view of a further embodiment of the blade;

FIG. 3A is a perspective view showing of the one position of the adjusting arrangement;

FIG. 3B is a prospective view showing another position of the adjusting arrangement;

FIG. 3C is a perspective view showing one position of another embodiment of the adjusting arrangement;

FIG. 3D is a perspective view showing another position of the adjusting arrangement of FIG. 3C;

FIG. 4 is a perspective view showing an alternate embodiment of the receiving cavity;

FIGS. 12 and 13 are views showing alternate embodiments of the blade assembly;

FIG. 14 is a perspective view of a further embodiment of the grooming tool;

FIG. 15 is a perspective front view showing the blade assembly;

FIG. 19 is a view of still another embodiment of the grooming tool.

DETAILED DESCRIPTION OF THE INVENTION

Figure 1:
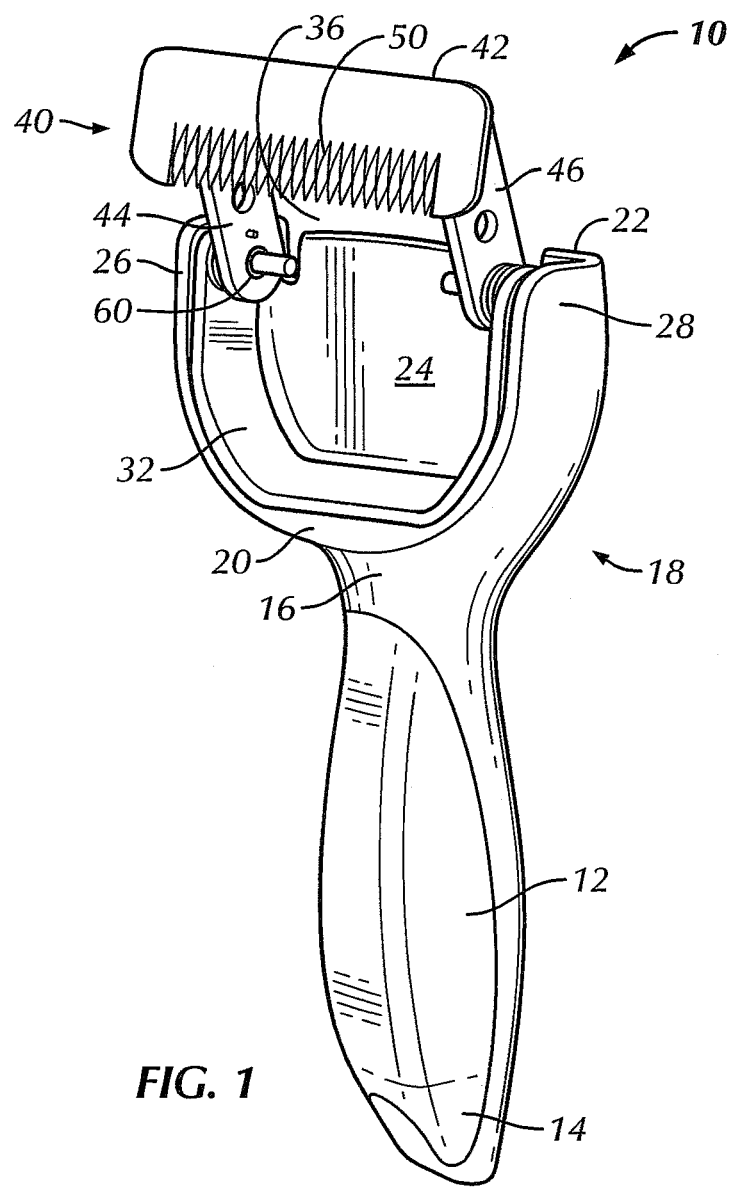
FIG. 1 is a perspective view of one embodiment the grooming tool of the invention.

Referring now to the drawings in general and to FIG. 1-5 in particular illustrating the pet grooming tool 10 of the invention. A handle 12 configured for convenient positioning in a hand of an operator extends between a rear end 14 and a neck portion 16. The blade guiding portion 18 is provided at the neck portion and is formed with a proximal part 20 connected to the neck portion and a distal part 22 facing a blade assembly 40. The blade assembly 40 is pivotably mounted to the blade guiding portion 18.

A receiving cavity 24 extends within the guiding portion 18 between the proximal and distal ends thereof. The receiving cavity 24 is defined by sidewalls 26 and 28 interconnected by the top wall 30.

The blade assembly 40 consists of a blade 42 with connecting arms 44, 46 extending outwardly therefrom on both sides of the blade. The blade 42 is positioned at an angle to the connecting arms. In one embodiment, the blade 42 is a substantially flat solid component with a front portion part 48 having a set of teeth 50 and a rear part 52. The grooves formed within the blade feed the hair into the teeth. It will be discussed below that in use, the blade and the teeth are oriented at an acute angle A to the coat of a pet. Although the angle A may vary in the preferred embodiment, it is within the range between 10° and 45°. In this manner, the tool combs with the blade and teeth being positioned at an acute oblique angle, which corresponds to the angle of the follicles at the skin of the specific breeds of cats and dogs discussed above.

In one embodiment of the invention, the teeth of the blade are not sharp, so as to further facilitate pulling hair out of the follicle without cutting the hair.

Although a substantially flat blade has been discussed above, it should be understood that blades having various configurations are within the scope of the invention. It is illustrated in FIG. 2B that in an alternate embodiment the blade 45 is formed having a curvature or a bend facilitating engagement of the blade with various parts of pet's body, especially those which are not completely flat. In this embodiment the curvature or bend extends throughout the body of the blade. On the other hand, the curvature can be limited to the front portion of the blade. The curved blade further enhances the ability of the tool to follow closely a contour of the pet's body.

As illustrated in FIG. 2A, the teeth 50 can be formed not only at the front 48, but also at the rear part 52 of the blade 47. For example, medium teeth can be provided at the front, with course teeth forming the rear part of the blade.

In one embodiment of the invention, as shown in at least FIGS. 1 and 3A-3D a frame 32 is positioned within the receiving cavity 24 to facilitate assembly of the tool. The frame 32 follows an inner periphery of the receiving cavity 24, including the side walls 26, 28. The blade assembly 40 is mountable to the frame 32 and the guiding portion 18 at a mounting location, so as to define a pivot joint 60 enabling pivotal movement of the blade assembly with respect to the guiding portion 18 and the handle 12. The overall shape of the connecting arms 44, 46 is determined by the need for the blade assembly to perform its function and also to facilitate longitudinal adjustment and pivotal motion of the blade relative to the handle. At the pivot joint 60 the connecting arms 44, 46 are connected to side portions of the frame 32 and to the receiving cavity 24 by a member 62. In one embodiment of the invention the member 62 is a conventional fastener, including but not limited to screws, rivets, bolts, pins, quick-release fasteners, spring-loaded detents and the like. The pivot joint allows the user quickly and easily to adjust the tool 10 from one operating position to another operating position.

In the assembled condition, the front part of the blade 48 is spaced from the distal part 22 of the guiding section 18 by an operational gap 36. The gap 36 can be adjusted by the adjusting arrangement 70 facilitating a longitudinal motion of the connecting arms 44, 46 in either direction with respect to the pivotal joint 60. By adjusting the operational gap 36 or the distance between the blade and the guiding portion, the tool of the invention can accommodate a variety of pets having different length and other hair characteristics.

In the embodiment illustrated in FIGS. 3A and 3B, the adjusting arrangement 70 is formed by a plurality of openings 66 formed in the connecting arms, which are adapted for respective engagement with the member 62. The respective openings in the side portions of the frame may be also provided. In another embodiment, as illustrated in FIGS. 3C and 3D, longitudinal slots 68 are formed within the connecting arms 44, 46 to facilitate longitudinal motion of the blade 42 relative the guiding portion 18.

A biasing arrangement is provided to perform the self-adjusting function of the tool, so as to facilitate returning the blade assembly 40 to the predetermined inclined position. As shown in FIGS. 1 and 3A-3D in one embodiment, the biasing arrangement is in the form of a coil spring 56 provided at the pivot joint 60.

Figure 5:
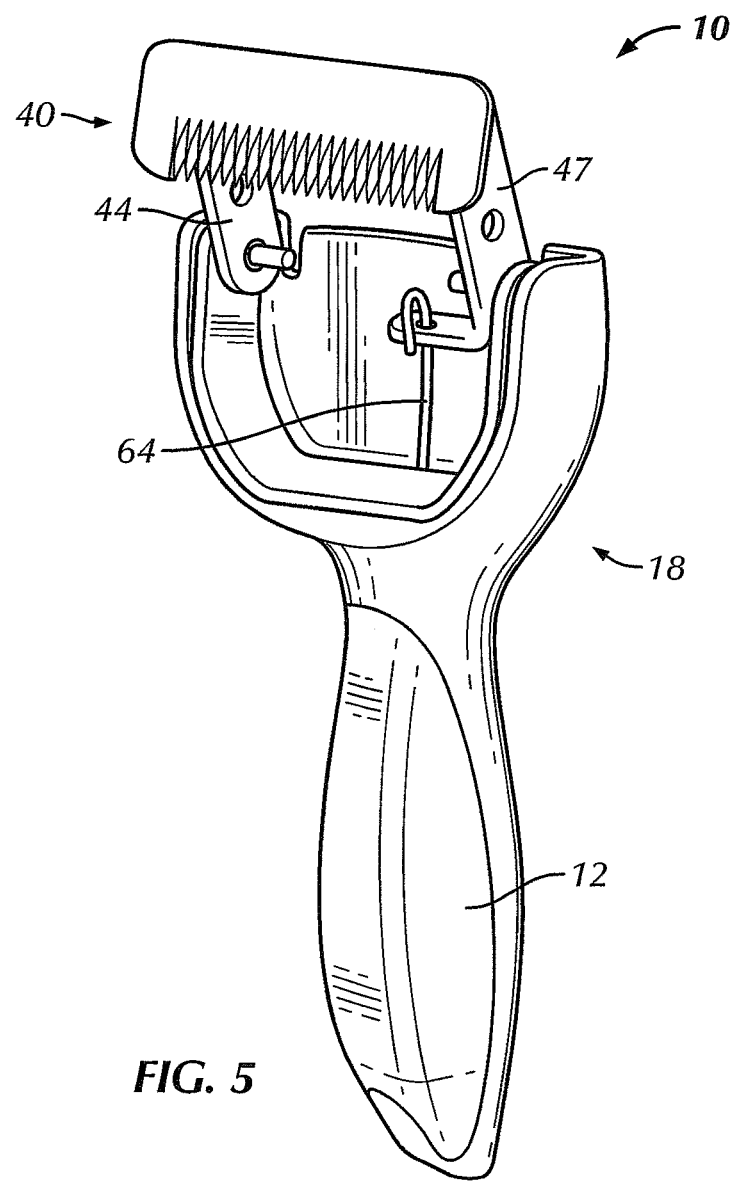
FIG. 5 is a perspective view of the grooming tool having an alternate arrangement of the biasing arrangement.
Figure 5A:
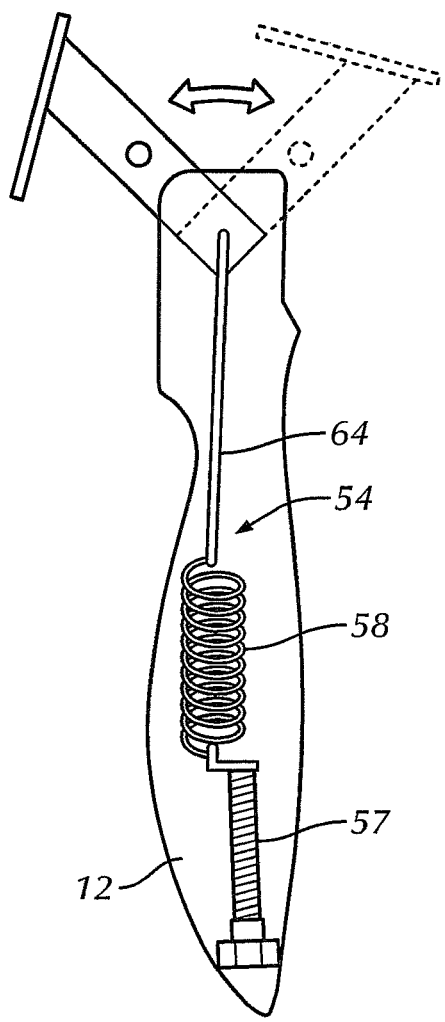
FIG. 5A is a schematic diagram illustrating operation of the biasing arrangement of FIG. 5.

Another biasing arrangement in the form of an elongated spring 58 positioned within the handle 12, as illustrated in FIGS. 5 and 5A. A connecting member or rod 64 extends from one side of the spring 58 to one of the connecting arms 47 of the blade assembly. The other end of the spring is associated with the adjustable tension knob 57 provided to adjust characteristics of the spring 58.

It should be understood, however that other ways of creating the pivotal connection between the blade assembly and the receiving cavity are within the scope of the invention. For example, the embodiment illustrated in FIG. 4, the receiving cavity 24 is formed without the frame. Thus, a pivot joint is formed at the side walls 26, 28 of the receiving cavity. In this manner, the connecting arms are disposed in the close vicinity of and spaced from the side walls of the receiving cavity and the exterior surfaces of the arms 44, 46 face the side walls.

In a further embodiment, where a wide version of the blade assembly with the increased distance between the connecting arms is utilized, an exterior pivotal connection between the blade assembly and the receiving cavity is formed. In the assembled condition of this embodiment, the inner surfaces of the connecting arms face the outer areas of the side walls.

Although the blade assembly has been discussed above with a specific design of the blade and teeth, it should be understood that various designs of the teeth and spaces between the teeth are within the scope of the invention. For example, the blade can be provided having fine, medium and course teeth. Furthermore, in the invention, the blade is removable, interchangeable and reversible. Such removable, interchangeable functions can be accommodated by a special design of the blade assembly, wherein the blade can be removably attached to the arms by means of fasteners or any other conventional means. The pivotal arrangement of the invention simplifies removal and replacement of the blade. In this manner, use of the tool with different types of teeth and blades is applicable to most breeds discussed above and to facilitate operation of the tool by an operator with various degrees of experience.

Figure 6:
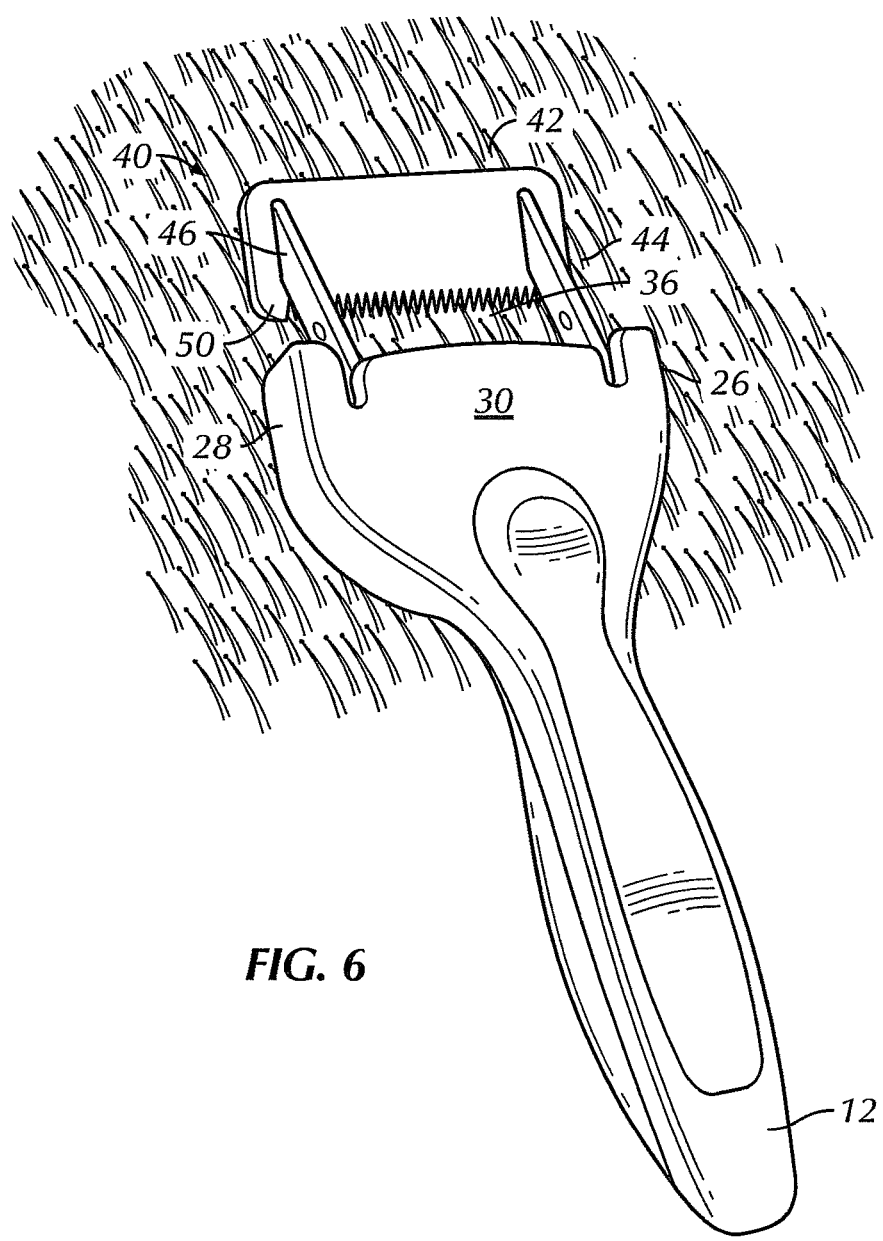
FIG. 6 is a perspective view of the grooming tool of the invention in use.
Figure 7:
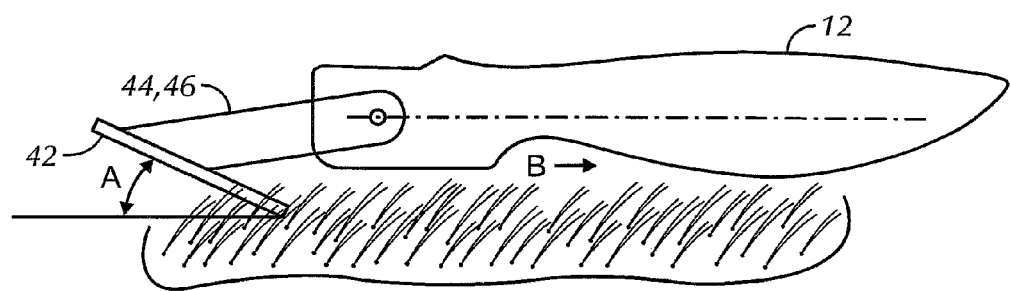
FIG. 7 is a schematic diagram illustrating a method of the invention.

According to the method of the invention as illustrated in FIGS. 6 and 7, to remove hair from a pet, a user initially places the blade guiding section 18 including the receiving cavity 24 and the blade 42 of the pet grooming tool 10 on the pet's coat. In this position, the blade 42 including the front portion 48 with the teeth 50 is positioned at the acute angle A to the coat surface. As the operator pulls the handle 12 generally along its longitudinal axis, in the direction of Arrow B shown in FIG. 7, the blade 42 trails the blade guiding portion 18. Due to the pivotal joint 60, the tool of the invention is self-adjusting, and the angular orientation of the blade relative to the pet's coat is maintained through the grooming process. Pulling the pet grooming tool 10 causes the blade 42 to engage the non-loose hair of the pet and to remove it from the coat.

According to another aspect of the method of the invention, the tool guiding section 18 is positioned on the pet's body with the receiving cavity facing the coat. Upon movement of the tool by the operator, the substantially hollow cavity 24 receives the pet's hair and directs such hair to the blade assembly 40. This motion is facilitated by the pivotal connection 60, so that the blade glides following the natural contour of the pet's body. During this gliding motion, the blade 42 is oriented and engages the hair of the pet at the oblique angle A. In the preferred embodiment, this angle does not exceed 30°, so as to correspond to the angle at which the hair follicles are positioned within the body of the breeds discussed above. Due to the pivotal connection between the blade 42, the guiding portion 18 and the handle 12, the angular orientation of the blade is self-adjusting, so as to follow a natural contour of the respective part of the pet's body.

As to another aspect of the method of the invention, as the handle is being pulled longitudinally, due to the gliding motion of the blade 42 along the pet's body, the pressure exerted by the operator through the tool on the pet's body is minimized. In many instances, the operator does not apply any pressure to the blade. Thus, injury to the pet's skin is minimized. In the prior art where the blade is positioned at a 90° angle to the skin, a pressure must be applied to the blade for a tool to function appropriate, especially when the undercoat has to be reached.

Thus, the invention provides a safe and non-aggressive method of grooming a pet, where the blade freely follows, gliding along the pet's body with a minimal pressure being applied on the blade. During the gliding motion, the angular oriented blade combs through the outer coat without damaging the skin of a pet.

Due to the self-adjusting function, the blade 42 glides over the top coat/hair, so as to remove the live hair positioned on top of the coat, supported by the follicles, with a limited effect on the hair positioned at the bottom. In the method of the invention, the blade pulls out hair which has already been released from the follicle, i.e., hair which has been detached from the bulb, but still remains within the follicle. The non-aggressive gliding motion of the blade pulls out such hair gently, so as to stimulate release of oil from the follicle and encourage new hair growth.

Referring now to FIGS. 8-13 illustrating another embodiment of the pet grooming tool 100 of the invention. A handle 112 configured for convenient positioning in a hand of an operator extends between a rear end 114 and a neck portion 116 along a longitudinal axis A-A of the tool. A guiding arrangement 118 formed at the neck portion. The blade assembly 140 is pivotably mounted to the handle and is formed with a blade 142 and connecting arms 144, 146 extending outwardly on both sides of the blade between connecting portions 156, 158 and free end portion 148, 150. Each connecting arm is formed with operational opening 136,138 at the free end portion thereof.

In this embodiment, side walls 128, 130 of the neck portion 116 are disposed at an angle B to the longitudinal axis A-A. In the blade assembly the distance between the end portions 148, 150 of the connecting arms is greater than the distance between the connecting portions 156, 158. The connecting arms are formed from a spring-type material and characterized by the ability to withstand substantial deflection elastically. Pivot members 166, 168 extend outwardly from the side walls 128, 130. For example, the pivot members can be in the form of fasteners engaging the side walls of the neck portion, so as to extend along the transverse axis B-B. As illustrated in FIGS. 8-11, in the assembled condition of this embodiment, guiding elements 169 (which can be in the form of circumferential elements) are provided, so that the end portions 148, 150 of the connecting arms are disposed between the angle-shaped side walls 128, 130 of the neck portion and the guiding elements 169.

The blade assembly 140 is mountable to the handle at a mounting location, so as to define a pivot joint 160 enabling its pivotal movement with respect to the handle 112. The pivot joint 160 comprises pivot members 166, 168 and the guiding elements 169. The operational openings 136, 138 of the connecting arms 144, 146 movably engage the pivot members 166,168, in such a manner that the end portions 148,150 in their pivotal motion are guided by the surfaces of the guiding elements 169. The pivot joint 160 allows the user quickly and easily to adjust the tool 100 from one operating position to another operating position.

In one embodiment, the blade 142 is a substantially flat solid component with a front portion part 147 having a set of teeth 149 and a rear part 151. The grooves formed within the blade feed the hair into the teeth. In use, the blade and the teeth are oriented at an acute angle to the coat of a pet. In one embodiment of the invention, the teeth of the blade are not sharp, so as to facilitate pulling hair out of the follicle without cutting the hair.

Although a substantially flat blade has been discussed above, it should be understood that blades having various configurations are within the scope of the invention. It is illustrated in FIG. 13 that in an alternate embodiment the blade 157 is formed having a curvature or a bend facilitating engagement of the blade with various parts of pet's body, especially those which are not completely flat. In this embodiment the curvature or bend extends throughout the body of the blade. On the other hand, the curvature can be limited to the front portion of the blade. The curved blade further enhances the ability of the tool to follow closely a contour of the pet's body.

As illustrated in FIG. 12, the teeth 149 can be formed not only at the front 147, but also at the rear part 151 of the blade 142. For example, medium teeth can be provided at the front, with course teeth forming the rear part of the blade.

Figure 10:
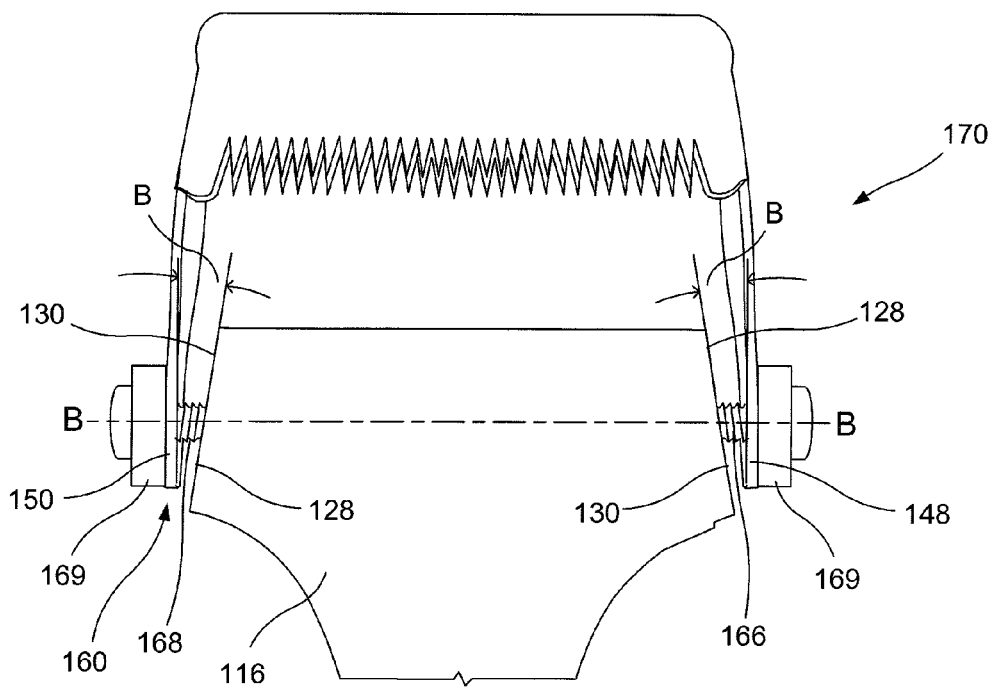
FIG. 10 is a bottom view showing the blade assembly.
Figure 11:
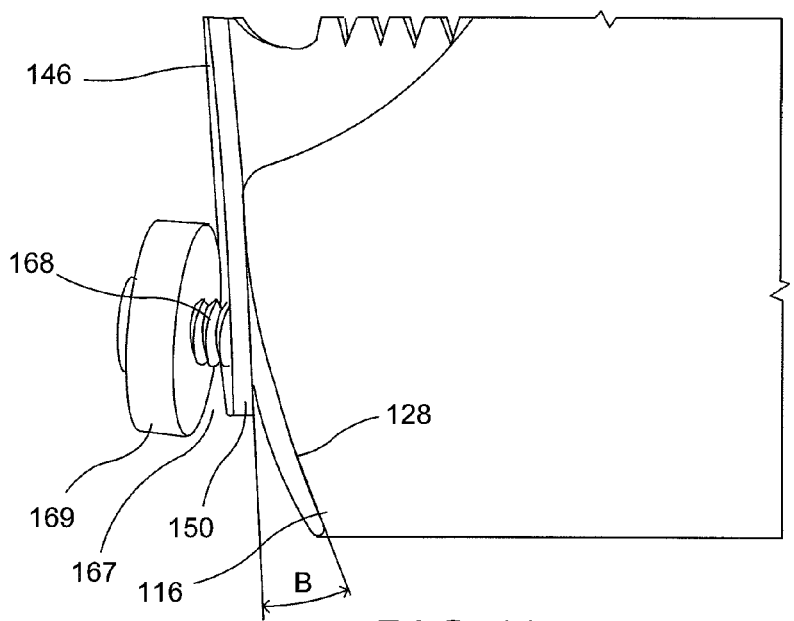
FIG. 11 is an enlarged detailed view showing a pivotal arrangement.
Figure 16:
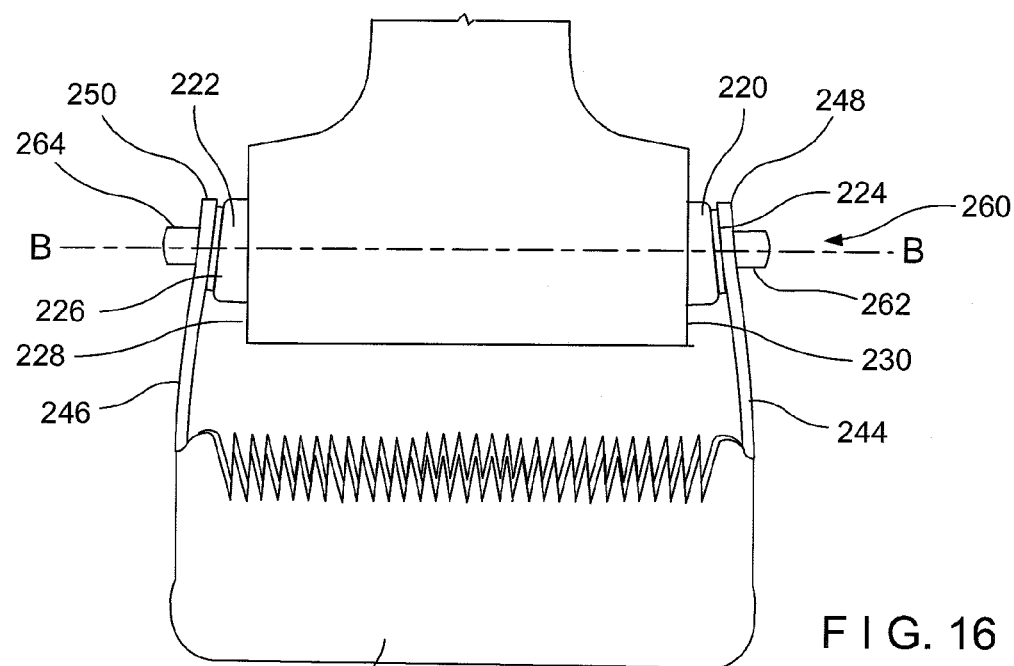
FIG. 16 is a perspective bottom view showing the blade assembly.

An essential aspect of the invention relates to a biasing arrangement 170 provided to perform a self-adjusting function of the tool, so as to facilitate move of the blade assembly 140 from one operational position to another position. In the illustrated embodiment, the biasing arrangement 170 is provided at the interface between at least the end portions 148 and 150 of the connecting arms 144, 146 and the guiding surfaces of the pivot elements 169 and/or the side walls 128,130 of the neck portion 116. As best illustrated in FIG. 10 the connecting arms, including the end portions 148, 150, are twisted, bent or otherwise deformed. The connecting portions 156, 158 of the connecting arms are disposed within planes which are different from the planes of the free end portions 148, 150. Various types of deformation of the connecting arms are within the scope of the invention. In the illustrated embodiment the arms are deformed, so that the distance between the end portions 148, 150 is substantially greater than the distance between the connecting portions 156, 158. In other words, the distance between the end portions 148, 150 is greater than the distance between the connecting portions 156, 158 of the blade assembly 140.

The connecting arms 144, 146 are typically made from a material having spring-type characteristics or qualities. In this manner, the biasing arrangement 170 is capable of storing energy and to generate a force by elastic deflection upon deformation of the connecting arms.

In the biasing arrangement 170 of the invention, the energy is recoverable by the elastic return of the connecting arms 144, 146 to their initial condition. The connecting arms 144,146 are characterized by the ability to withstand relatively large deflection elastically. The energy stored can be measured by the volume of distorted material of the connecting arms. In some instances, the volume of the distorted material is limited by the capacity configuration of the arms and their stress-carrying capacity (elastic limit). The connecting arms 144, 146 can be made from the group of high-strength material including but not limited to carbon steel, including high-carbon steel, cold-rolled and precipitation-hardening stainless and non-ferrous alloys, and specialized non-metallic, such as laminated fiber-glass, for example. In actuality, the connecting arms 144, 146 which undergo elastic deflection during the use of the tool 100, are made of materials capable of withstanding stresses without yielding.

Figure 8:
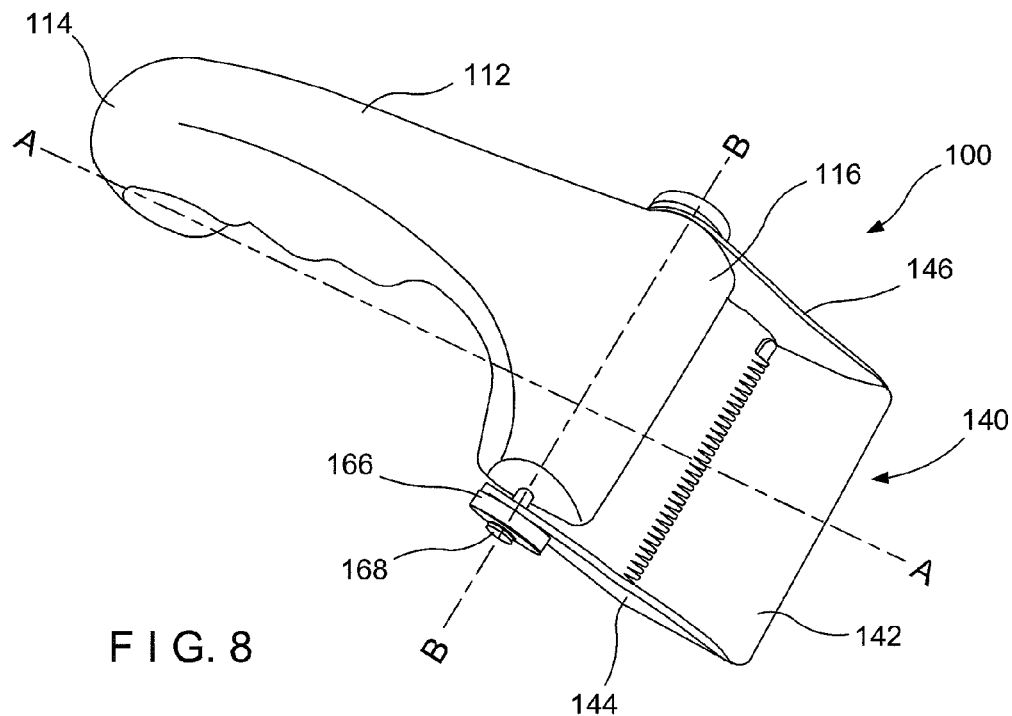
FIG. 8 is a perspective view of another embodiment of the grooming tool of the invention with the blade assembly in the initial extended position.
Figure 9:
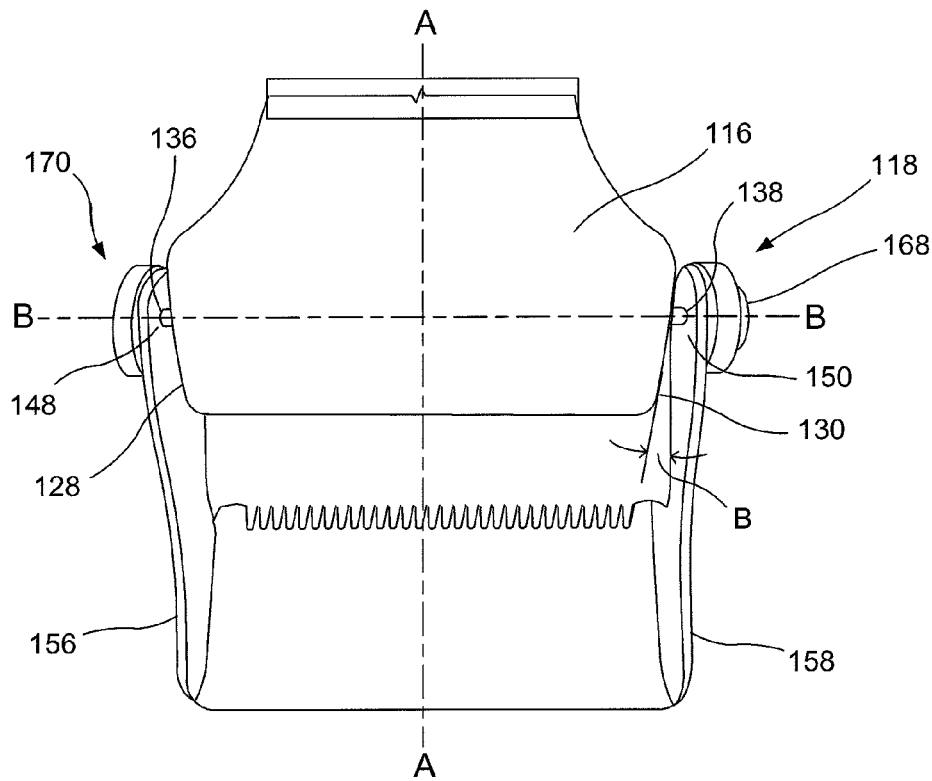
FIG. 9 is a perspective front view showing the blade assembly.

In the initial position of the tool illustrated in FIGS. 8-10, the end portions 148, 150 are oriented so as to engage or to extend along inner surfaces of the guiding elements 169. Upon pressure being applied by an operator to the blade 142, the blade assembly 140 pivotably rotates along the pivot members 166, 168. In this pivotal motion, since the connecting aims are being spread apart, the end portions 148, 150 are pressed inwardly or in the direction of each other. In this manner (see FIG. 11), a gap 167 is developed between the inner surfaces of the guiding elements 169 and the end portions 148, 150. This deformation occurs due to the ability of the connecting arms to withstand such deflection elastically. In view of the deformation and the string-type qualities of the biasing arrangement 170, energy is stored in the distorted material of the blade assembly. Upon pressure to the blade being terminated, or upon the tool being removed from its engagement with a fur of an animal, the end portions 148, 150 are returned to their initial position along the inner surfaces of the guiding element 169 (see FIGS. 8-10).

Due to the design of the pivot joint 160, in one embodiment of the invention, the pivotal movement of the blade assembly 140 with respect to the handle 112 is unrestricted. This means that, in operation of this embodiment the blade 142 freely floats along the coat of a pet. The pivot members 166, 168 are adapted to adjustably engage the neck portion 116 in general and side walls thereof 128, 130 in particular. In the illustrated embodiment the pivot members 166,168 threadably engage the side walls 266,168.

In an embodiment illustrated in FIG. 19, upon tightening of the pivotal members within the walls 128,130, the end portions 148, 150 of the connecting portions are squeezed between the side walls and elements 171. In an alternate embodiment no elements 171 are provided and the end portions 148,150 are squeezed between the side walls 128, 130 and head portions 173 of the fasteners. In this embodiment, angular orientation of the blade 142 with respect to the handle 112 is fixed. Thus, the blade 142 and the teeth are constantly oriented at an acute angle to a bottom surface of the neck portion 116 and ultimately to the coat of a pet. In use a substantially flat base region of the neck portion is positioned on the pet's body with the teeth facing the coat. Upon movement of the tool by the operator, the pet's hair is directed to the teeth of blade assembly. In this motion, the blade is oriented and engages the hair of the pet at the prefixed oblique angle. The present invention provides the grooming tool which is quite versatile and can be used not only when the blade assembly is pivotal, but also when fixed orientation of the blade with respect to the handle is required.

According to the method of the invention as illustrated in FIGS. 8-11, to remove hair from a pet, a user initially places the blade assembly 140 with the blade 142 of the pet grooming tool on the pet's coat. As the operator pulls the handle 112 generally along its longitudinal axis A-A, the blade 142 trails the handle. Due to the pivotal joint 160 formed with the biasing arrangement 170, the tool of the invention is self-adjusting, and the angular orientation of the blade relative to the pet's coat is maintained through the grooming process. Pulling the pet grooming tool 100 causes the blade 142 to engage the hair of the pet and to remove it from the coat.

According to another aspect of the method of the invention, movement of the tool by the operator is facilitated by the pivotal connection 160, so that the blade glides following the natural contour of the pet's body. During this gliding motion, the blade 142 is oriented and engages the hair of the pet at the oblique angle A. Due to the pivotal connection between the blade 142 and the handle 112, the angular orientation of the blade is self-adjusting, so as to not only follow a natural contour of the respective part of the pet's body, but also to return the blade assembly to its initial position after the end of the grooming process.

Referring now to FIGS. 14-18 illustrating a further embodiment of the pet grooming tool 200 of the invention. Similar to the previous embodiment, the handle 212 configured for convenient positioning in a hand of an operator extends between a rear end 214 and a neck portion 216. A guiding arrangement 218 formed by guiding members 220, 222 is provided at the neck portion. As illustrated, the guiding members extend outwardly on both sides of the neck portion 216 along the transverse axis B-B of the tool. Each guiding member is formed with an outer guiding surface 224, 226 positioned at an angle to the transverse axis B-B. The blade assembly 240 is pivotably mounted to the handle in the manner similar to the discussed above.

The blade assembly 240 is mountable to the handle at a mounting location, so as to define a pivot joint 260 enabling its pivotal movement with respect to the handle 212. The pivot joint 260 comprises pivot members 262, 264 extending on both sides of the neck portion along the transverse axis B-B of the tool. In this embodiment, the pivot members 262,264 extend from side walls 228,230 of the neck portion to accommodate the guiding members 220 and 224. In the assembled condition, the operational openings 236, 238 of the connecting arms 244, 246 movably engage the pivot members 262,264, in such a manner that the end portions 248,250 in their pivotal motion are guided by the guiding surfaces 224, 226. The pivot joint 260 allows the user quickly and easily to adjust the tool 100 from one operating position to another operating position.

The biasing arrangement 270 is provided to perform a self-adjusting function of the tool, so as to facilitate movement of the blade assembly 240 from one operational position to another position. In this embodiment, the biasing arrangement 270 is provided at the interface between at least the end portions 248 and 250 of the connecting arms 244, 246 and the guiding surfaces 224, 226 of the guiding members 220, 224. The connecting arms, including the end portions 248, 250, are twisted, bent or otherwise deformed with respect to the longitudinal axis A-A of the tool. The deformed end portions 248 and 250 engage the guiding surfaces 224, 226 of the guiding members.

The connecting anus 244, 246 are made from a material having spring-type characteristics. The biasing arrangement 270 is capable of storing energy and to generate a force by elastic deflection.

To provide the required spring-type qualities, the ands 244,246 can be bent, twisted, stretched or compressed so as to adapt to a suitable configuration. In the illustrated embodiment the arms are spread, so that the distance between the end portions 248 and 250 positioned remotely from the blade 242 is greater than the distance between the connecting portions 256, 258 situated at the blade. In the biasing arrangement 270 of the invention, the energy is recoverable by the elastic return of the connecting arms 244, 246 to their initial condition.

In the grooming tool of this embodiment, upon pivotal motion of the connecting arms 244, 246, the inner surfaces of the end portions 148, 150 movably engage the guiding surfaces 224, 226 disposed at a predetermined angle to the axis B-B. The generated forces acting against the ends portions 248,250 act to return the connecting arms and the blade assembly to their initial position. This means that after an operator applies pressure against the blade 242, the biasing arrangement 270 performs the self-adjusting function and returns the blade assembly 240 including the connecting arms 244, 246 to the initial position, so as to extend along the longitudinal axis A-A.

Figure 17:
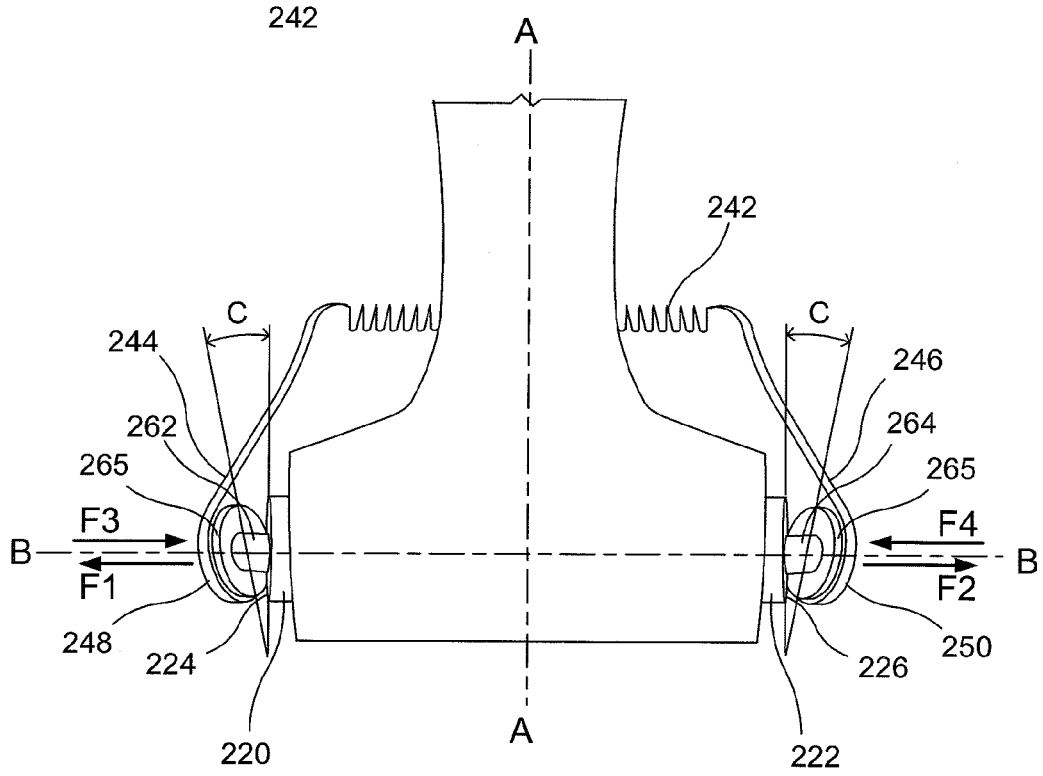
FIG. 17 is another perspective view of the grooming tool.
Figure 18:
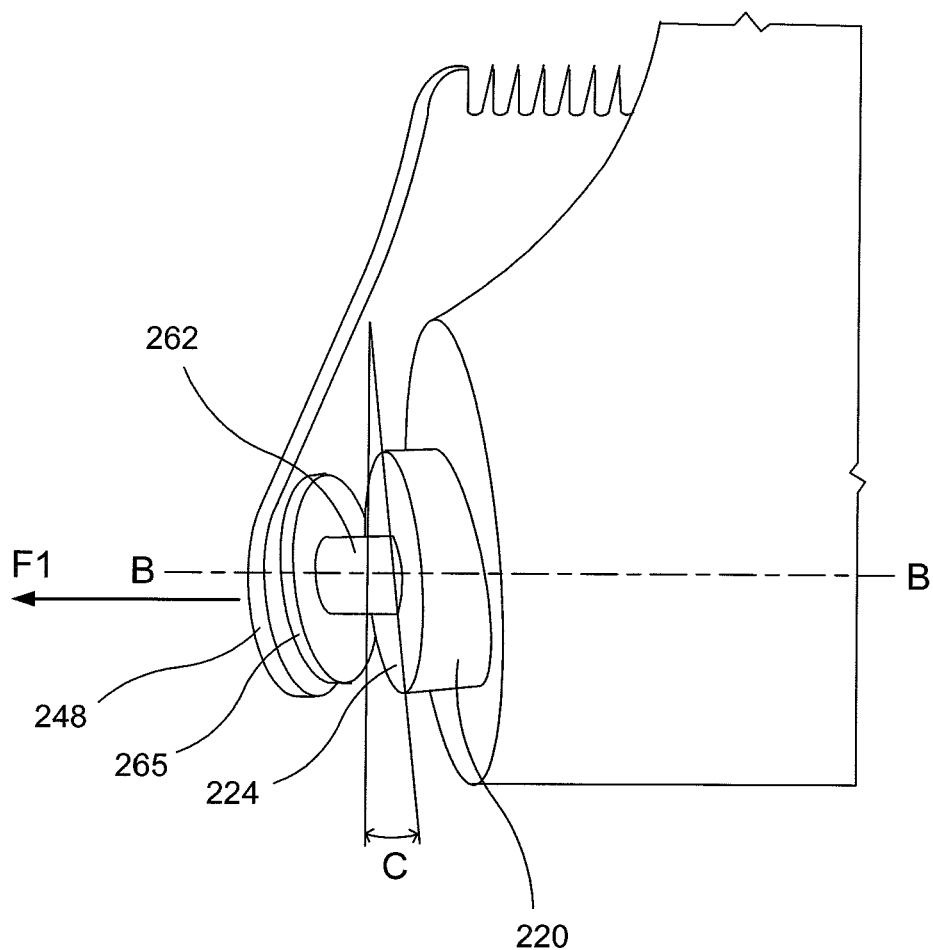
FIG. 18 is an enlarged detailed view showing the pivotal arrangement.

In the biasing arrangement 170 of the embodiment illustrated in FIGS. 14-18 the guiding surfaces 224, 226 of the guiding members are arranged, so as to be positioned at an angle C to the transverse axis B-B. In various embodiments of the invention, the angle C may vary significantly. The inner surfaces of the end portions 148, 150 are disposed, so as to engage or to follow the guiding surfaces 224, 226. To facilitate pivotal/rotational motion of the connecting arms relative to the pivot members 260, 262, as illustrated in FIGS. 17 and 18, spacers 265 can be positioned within a gap between the inner surfaces of the end portions 248, 250 and the guiding surfaces 224, 226. Initially, end portions 248, 250 extend along or engage guiding surfaces 224, 226 (see FIG. 15). Upon pressure being exerted by an operator through the handle 212 on the blade assembly 240, the connecting arms 244, 246 including the free ends thereof 248, 250 are pivotably moved about the pivotal members 260, 262. In this motion, the end portions 248, 250 press against the angle-shaped guiding surfaces 224, 226, so as to generate outwardly extending forces F1 and F2 (see FIGS. 17 and 18) spreading the arms 244, 246 apart, so that the gap is developed. As the end portions being spread apart, due to their ability to withstand deflection elastically, the energy is stored in the distorted material of the connecting arms.

Upon termination of the pressure applied by the operator to the blade 242, or disengaging the blade assembly 240 from the fur of a pet, the spring forces F3, F4 of the arms press inwardly causing return the connecting arms to their initial position, so as to have the end portions to be oriented substantially along the guiding surfaces 224, 226.

Although, in the embodiment of FIGS. 14-18, the guiding members 220, 222 are formed as separate elements extending from both sides of the neck portion 216, other modifications of the guiding members are within the scope of the invention. For example, a single, unitary guiding element can be provided extending through the neck portion 216 along the transverse axis B-B. In this embodiment, guiding surfaces are formed at the parts part of this unitary element extending from the sides of the neck portion. Furthermore, in the illustrated embodiment the pivot members 262, 264 are shown as independent elements extending from the guiding members 220, 222. In the alternate embodiment, the pivot members can be formed as parts of the unitary rod passing through the neck portion along the transverse axis B-B.

An essential aspect of the method of the invention relates to the ability of the blade assembly 242 to return to its initial position upon termination of the pressure exerted by an operator through the handle 212 and the blade assembly 240. As discussed above, initially, upon the pressure being exerted through the handle 212 on the blade assembly 240, the connecting arms 244, 246 are pivotably moved about the pivot joint 260. Due to the elasticity of the discussed elements, a pressure is being applied by the end portions 248, 260 against the guiding members. In this manner outwardly extending forces resulted in the elastic deflection of the connecting arms 244, 246 is generated. This causes storing of energy in the blade assembly 240. The blade assembly 240, including the connecting arms 244, 246, are characterized by the ability to withstand the produced deflection elastically. A further essential aspect of the method of the invention relates to the ability of the distorted material of the connecting arms to recover the energy, so as to assure the elastic return thereof to the initial position. In the method of the invention, such recovery of the energy by the elastic return of the distorted elements occurred upon termination of the grooming process, or when pressure is no longer applied by an operator through the handle to the blade assembly. This means that upon termination of the pressure by the operator or disengaging the blade assembly from a pet, the spring forces of the connecting arms press inwardly causing their return and the entire blade assembly 140 to their initial position, so as to extend within the device along the longitudinal axis A-A.

As to another aspect of the method of the invention, as the handle is being pulled longitudinally, due to the gliding motion of the blade 242 along the pet's body, the pressure exerted by the operator through the tool on the pet's body is minimized. In many instances, the operator does not apply any pressure to the blade. Thus, injury to the pet's skin is minimized.

Thus, the invention provides a safe and non-aggressive method of grooming a pet, where the blade freely follows, gliding along the pet's body with a minimal pressure being applied on the blade. During the gliding motion, the angular oriented blade combs through the outer coat without damaging the skin of a pet.

It should be understood that the method and the grooming tool of the invention are not limited to just the care and grooming of dogs and cats but can be used on a wide variety of domestic animals. The animal grooming tool of the invention discloses arrangements of elements of particular construction and configuration for illustrating preferred embodiments of structure and method of operation of the present device. It is to be understood, however, that elements of different construction and configuration and other arrangements thereof, other than those illustrated and described, may be employed for providing an animal grooming tool in accordance with the spirit of this invention, and such changes, alternations and modifications as would occur to those skilled in the art are considered to be within the scope of the combination animal grooming tool as broadly defined in the appended claims.

What is claimed is:

1. A pet grooming tool for removing hair from a coat of a furry pet, the grooming tool comprising:
    an elongated handle extending generally along a longitudinal axis of said grooming tool and including a neck portion;
    a blade guiding arrangement provided at said neck portion; a blade assembly pivotably connected to said blade guiding arrangement, said blade assembly including:
        a blade having a blade body uninterruptedly extending within a single plane between a front part facing said neck portion and a rear part distal to said neck portion, the front part with a set of teeth, said set of teeth being flush with said single plane of said blade body; and
        connecting arms extending outwardly on both sides of said blade, said blade positioned at an angle to a first end of said connecting arms; and
    said connecting arms connected at a second end to a pivotal arrangement, said pivotal arrangement adapted for pivotal motion of said blade assembly relative to said blade guiding arrangement.

2. The grooming tool according to claim 1, wherein said second end of said connecting arms include end portions disposed adjacent said pivotal arrangement, and wherein said blade guiding arrangement comprises:
    a pair of side walls of said neck portion disposed at an angle relative to a transverse axis of the tool; and
    a pair of guiding elements, each corresponding to a different one of said side walls, separate therefrom and adjacent thereto, and each including a first surface facing said end portions of said connecting arms and a second surface facing an exterior of said tool,
    wherein each of said end portions is disposed between one of said side walls of said neck portion and a corresponding one of said guiding elements.

3. The grooming tool according to claim 2, wherein said first end of said connecting arms further include connecting portions disposed at a junction between said connecting arms and said blade, and wherein a distance between said end portions of said connecting arms is greater than a distance between said connecting portions of said connecting arms.

4. The grooming tool according to claim 3, further comprising a biasing arrangement defined by said pair of guiding elements and said side walls of said neck portion, wherein at least said end portions comprise a material having spring-type qualities, and wherein said connecting arms are elastically able to withstand substantial deformation.

5. The grooming tool according to claim 4, wherein, during pivotal motion of said blade assembly relative to said blade guiding arrangement, said end portions are initially oriented to engage surfaces of said guiding elements, and upon application of pressure to said blade assembly, said end portions are pressed inwardly towards each other.

6. The grooming tool according to claim 5, wherein deformation of said connecting arms as well as a spring-type quality of said biasing arrangement cause energy to be stored in the spring-type material of said blade assembly, and wherein upon release of said pressure to said blade assembly, said end portions return to an initial position thereof along inner surfaces of said guiding elements.

7. The grooming tool according to claim 1, wherein said blade guiding arrangement comprises a pair of guiding members extending outwardly on both sides of said neck portion, each guiding member of said pair of guiding members includes an outer guiding surface positioned at an angle relative to a transverse axis of the tool.

8. The grooming tool according to claim 7, wherein said second end of said connecting arms include end portions, and said first end of said connecting arms include connecting portions disposed at a junction between said connecting arms and said blade, and wherein a distance between said end portions is shorter than a distance between said connecting portions.

9. The grooming tool according to claim 8, further comprising a biasing arrangement defined between said pair of guiding members and said end portions, wherein at least said end portions comprise a material having spring-type qualities, and wherein said connecting arms are elastically able to withstand substantial deformation.

10. The grooming tool according to claim 9, wherein pivotal motion of the connecting arms, while said end portions movably engage said outer guiding surfaces, generates forces acting against said end portions to return said connecting arms to an initial position thereof along said longitudinal axis of the tool.

11. The grooming tool according to claim 8, wherein during pivotal motion of said blade assembly relative to said blade guiding arrangement, said end portions are initially oriented to engage the said outer guiding surfaces of the said guiding members, and upon application of pressure to said blade assembly, said end portions are pressed outwardly away from each other.

12. The grooming tool according to claim 11, wherein deformation of said connecting arms as well as a spring-type quality of said biasing arrangement cause energy to be stored in the spring-type material of said blade assembly, and upon release of said pressure to said blade assembly said end portions move inwardly and return to an initial position thereof along said outer guiding surfaces.

13. A grooming tool according to claim 1, wherein said blade body is substantially flat.

14. A grooming tool according to claim 1, wherein said blade body is curved.

15. A method of removing hair from a furry pet by a grooming tool including an elongated handle extending generally along a longitudinal axis of the grooming tool and having at least a neck portion; a blade guiding arrangement provided at the neck portion, the blade guiding arrangement including side walls of the neck portion disposed at an angle relative to a transverse axis of the tool; a blade assembly pivotably connected to the blade guiding arrangement, said blade assembly including a blade having a blade body uninterruptedly extending within a single plane between a front part proximal to said neck portion and a rear part distal to said neck portion, the front part having a set of teeth being flush with said single plane of said blade body;

and connecting arms extending outwardly on both sides of the blade; and a pivotal arrangement providing adapted for pivotal motion of the blade assembly relative to the blade guiding arrangement;

the method comprising the steps of:

placing the blade guiding arrangement on a coat of a furry pet, so that the blade contacts the coat in such a manner that the blade, including the teeth, is positioned at an acute angle relative to the coat;

moving the handle portion generally along the longitudinal axis of the tool, while maintaining engagement of the blade with the coat to cause the blade to glide over the coat to engage hair of the pet and to pull said hair from the coat; and pivotally moving the connecting arms within the pivotal arrangement while the connecting arms movably engage the blade guiding arrangement, to generate forces acting against the arms in a direction substantially normal to said longitudinal axis; and returning the connecting arms and the blade to an initial position thereof along said longitudinal axis of the tool.

16. A method according to claim 15, wherein the grooming tool further comprises a biasing arrangement defined by the side walls of the neck portion and a pair of guiding elements, wherein at least the end portions of the connecting arms comprise a material having spring-type qualities.

17. A method according to claim 15, wherein during movement of said handle portion and gliding motion of said blade over said coat, said acute angle does not exceed 30°.

18. A method according to claim 17, wherein said acute angle corresponds to an angle at which hair follicles are positioned within the pet's body.

19. A method according to claim 15, further comprising a step of pivoting said blade assembly, so that an angular orientation of the blade assembly is self-adjusted following the motion of the handle along the pet's body.

* * * * *